United States Patent
Půta et al.

(10) Patent No.: US 11,273,584 B2
(45) Date of Patent: Mar. 15, 2022

(54) METHOD FOR PRODUCING A REINFORCING COMPONENT AND COMPONENT

(71) Applicant: Magna Exteriors (Bohemia) s.r.o., Liberec (CZ)

(72) Inventors: Josef Půta, Jablonec nad Nisou (CZ); Radim Žďárský, Liberec (CZ)

(73) Assignee: MAGNA EXTERIORS (BOHEMIA) S.R.O., Liberec (CZ)

( * ) Notice: Subject to any disclaimer, the term of this patent is extended or adjusted under 35 U.S.C. 154(b) by 395 days.

(21) Appl. No.: 16/378,958

(22) Filed: Apr. 9, 2019

(65) Prior Publication Data

US 2019/0315024 A1    Oct. 17, 2019

(30) Foreign Application Priority Data

Apr. 16, 2018  (DE) .................. 10 2018 205 733.8

(51) Int. Cl.
*B29C 44/02* (2006.01)
*B29C 44/42* (2006.01)
(Continued)

(52) U.S. Cl.
CPC .............. *B29C 44/02* (2013.01); *B29C 44/42* (2013.01); *B29C 53/56* (2013.01); *B29C 70/68* (2013.01);
(Continued)

(58) Field of Classification Search
CPC ......... B29C 44/02; B29C 44/42; B29C 53/56; B29C 70/68; B29C 44/12; B29C 33/12;
(Continued)

(56) References Cited

U.S. PATENT DOCUMENTS 3,914,081 A * 10/1975 Aoki .................. B29C 45/2681
                                                    425/130
4,762,740 A *  8/1988 Johnson ................ B29C 33/76
                                                     428/68
(Continued)

FOREIGN PATENT DOCUMENTS

CN         106827356 A      6/2017
DE       112006002513 T5    7/2008
(Continued)

OTHER PUBLICATIONS

European Search Report for corresponding European Application No. 19167662.6 dated Jan. 21, 2020.
(Continued)

*Primary Examiner* — Matthew J Daniels
*Assistant Examiner* — Gregory C. Grosso
(74) *Attorney, Agent, or Firm* — Dickinson Wright PLLC

(57) ABSTRACT

A method for producing a reinforcing component from different materials, wherein, in a first step, the component is produced in a first mould by plastics injection-moulding with foaming of the plastics material used and by reducing large cross sections of the component by insert parts of the same plastics material, wherein, in a second step, at least one type of fibre is wound around the component, and wherein, in the third method step, the component as a whole is overmoulded with plastic of a second plastics material in a second mould.

11 Claims, 2 Drawing Sheets

(51) Int. Cl.
*B29C 53/56* (2006.01)
*B29C 70/68* (2006.01)
*B60J 5/10* (2006.01)
*B62D 29/04* (2006.01)
*B29L 31/30* (2006.01)

(52) U.S. Cl.
CPC ............ *B60J 5/107* (2013.01); *B62D 29/043* (2013.01); *B29L 2031/30* (2013.01)

(58) Field of Classification Search
CPC ..... B29C 33/123; B29C 53/82; B29C 53/821; B29C 53/825; B29C 33/40; B29C 33/0016; B29C 70/48; B60J 5/107; B62D 29/043; B29L 2031/30
USPC ....................................................... 264/45.1
See application file for complete search history.

(56) References Cited

U.S. PATENT DOCUMENTS

| | | | | |
|---|---|---|---|---|
| 5,622,402 | A * | 4/1997 | Pritchard | B29C 44/086 296/191 |
| 6,755,998 | B1 * | 6/2004 | Reichard | B32B 17/067 264/46.5 |
| 7,784,844 | B2 | 8/2010 | Sato | |
| 2003/0152748 | A1 * | 8/2003 | Schonebeck | B60R 13/0225 428/143 |
| 2004/0222673 | A1 * | 11/2004 | Brown | B29C 44/1271 296/214 |

FOREIGN PATENT DOCUMENTS

| | | |
|---|---|---|
| DE | 102007014321 A1 | 10/2008 |
| DE | 102009019236 A1 | 11/2010 |
| JP | S6455216 A | 3/1989 |
| JP | 2015020343 A | 2/2015 |
| WO | 2017051375 A1 | 3/2017 |

OTHER PUBLICATIONS

European Search Report for corresponding German Application No. DE102018205733.8.

* cited by examiner

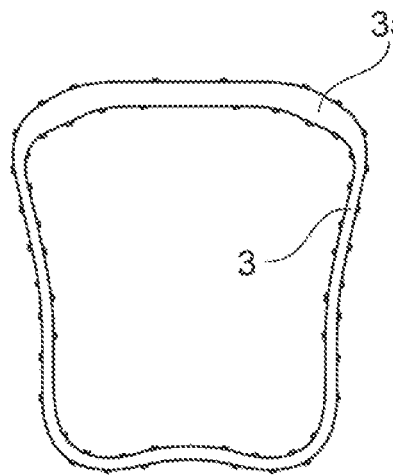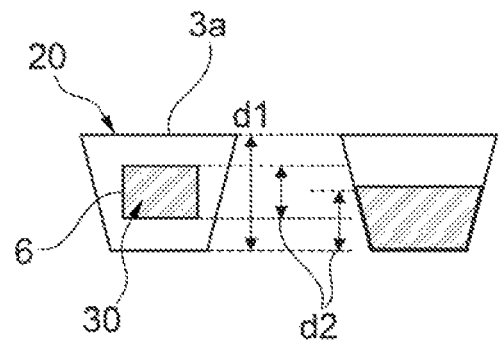
Fig. 3a   Fig. 3b
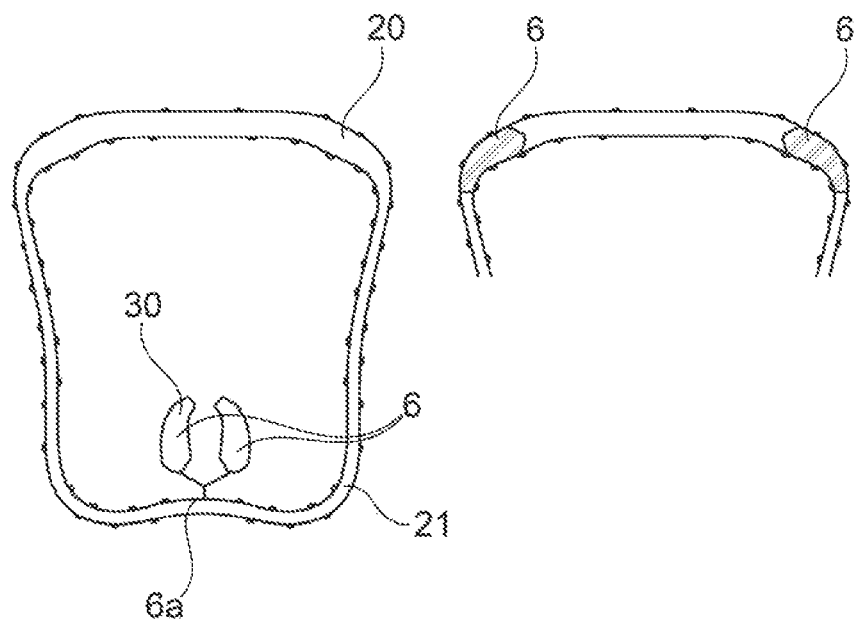
Fig. 4

METHOD FOR PRODUCING A REINFORCING COMPONENT AND COMPONENT

CROSS-REFERENCE TO RELATED APPLICATIONS

This application claims the benefit and priority of German Patent Application No. DE 102018205733.8, filed Apr. 16, 2018. The entire disclosure of the above application is incorporated herein by reference.

FIELD

The present invention relates to a method for producing a reinforcing component and to a component that is produced by the method.

BACKGROUND

This section provides background information related to the present disclosure which is not necessarily prior art.

Because of their high specific properties, fibre composite materials offer great potential for lightweight construction. Especially in the aeronautics and aerospace industry, carbon-fibre reinforced plastics have been used for decades. With the increasing market demand of the last decade, reinforcing fibres have become available at a price that also makes them of interest for mechanical engineering and construction and for the automobile sector. The high mechanical load-bearing properties of fibre composite materials together with their low density are prime motivating factors for using this new material.

They allow structures to be made more lightweight, and consequently used more efficiently. In classic lightweight construction, hollow profiles are usually used, but also foamed profiles.

Complexly shaped components are today mostly produced in a two-shell type of construction and later bonded together. Examples of this can be found in large numbers in the automobile sector. A problem with them however is the severing or discontinuity of the load-bearing fibres. The positive properties of the fibres therefore cannot be fully exploited, which leads to greater weight and lower fatigue strength.

An example from the automobile sector is that of vehicle tailgates. These tailgates, which were formerly produced from metal and provided on the inside with a plastic liner, are increasingly being made from plastic. In the prior art, metal frame structures connected to a sheet-like support part of plastic are still used for stiffening. The frame structures are preferably adhesively bonded. The support part with the frame structure is subsequently combined with trim parts and a rear window.

SUMMARY

This section provides a general summary of the disclosure, and is not a comprehensive disclosure of its full scope or all of its features.

The object of the invention is to produce a component for a vehicle from composite material that has optimum properties for a reinforcing task and can be easily produced. The aim here is to replace the metal frame by a composite material.

The object is achieved by a method for producing a reinforcing component from different materials, wherein, in a first step, the component is produced in a first mould by reaction injection-moulding with foaming of the plastics material used and by reducing large cross sections of the component by insert parts of the same plastics material, wherein, in a second step, at least one type of fibre is wound around the component and, in a third step, the component as a whole is overmoulded, or consolidated/penetrated with plastic of a second plastics material in a second mould.

This production process reduces the cycle rate very efficiently, since the foamed volumes of plastic are reduced.

It is in this case of advantage that the insert parts are in each case also produced in the first method step. As a result, no further production line for insert parts is required.

The production method proceeds particularly efficiently if the insert parts are in each case taken from the respectively preceding production process.

After the first product has run through the production method, and consequently after the production of the first insert parts, in every run through the production method the insert parts of the respective previously run-through method are used.

It is of advantage here if the insert parts fill the cross section in a region of the component up to a value of 50% of the large cross section of the component. This only leaves a small volume that has to be cured after foaming with plastic.

Advantageously, the insert parts are also moulded and foamed in a position of the component at which the component is smaller in its cross section than the largest cross section.

It is of advantage here that the cross section of the component at the position corresponds to approximately the cross section of the insert part.

The object is also achieved by a component that is produced by the method described above. The component is a stiffening component in automobile construction.

The method is particularly advantageous in that a component which is a frame of a vehicle door or vehicle flap, front-end module or side door can be produced.

Advantageously, the component is then fitted in a composite on further plastic components.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 3a and 3b show a frame in plan view and in a cross section; and

FIG. 4 shows the frame with insert parts after production and in the subsequent product.

Corresponding reference numerals indicate corresponding parts throughout the several views of the drawings.

DETAILED DESCRIPTION

Example embodiments will now be described more fully with reference to the accompanying drawings.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Figure 1:
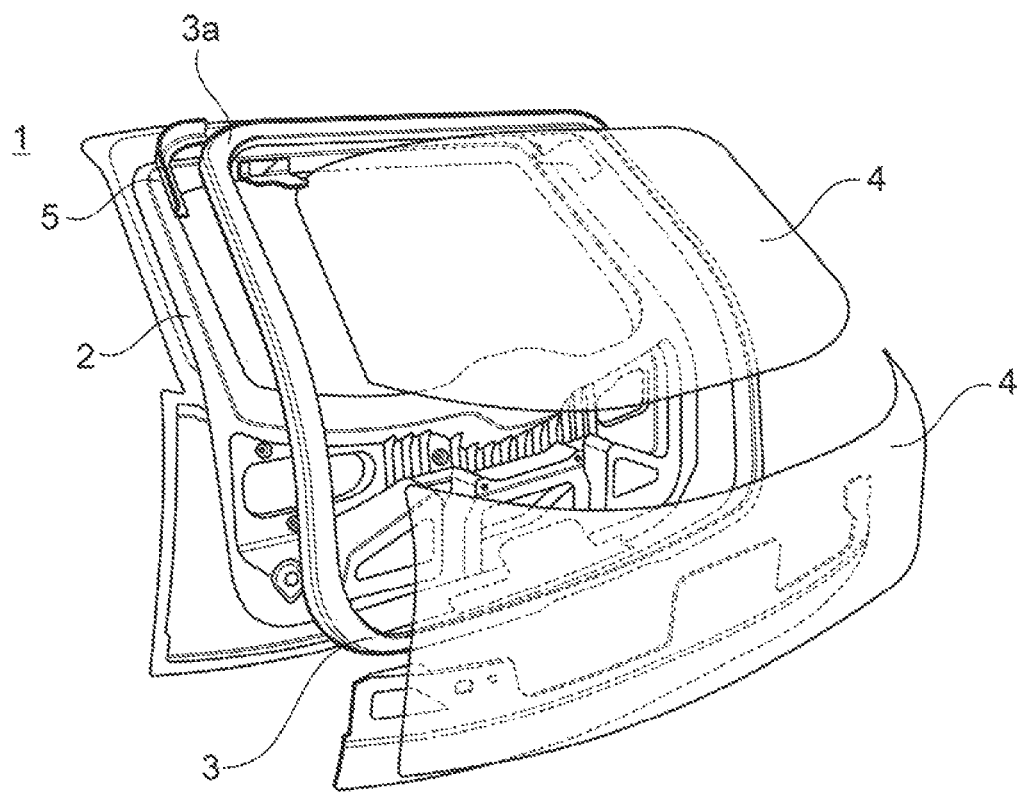
FIG. 1 shows a schematic representation of an embodiment of a tailgate that is given by way of example.

In FIG. 1, the main component parts of a tailgate 1 are shown. Serving as the basis of the tailgate is a support part 2, which is produced from fibre-reinforced plastics. The stiffening frame 3 is a closed form or else any non-closed form of a polyurethane material or other composite materials such as epoxy or vinyl ester. The trim parts 4 are connected to the support part 2. For stiffening the tailgate, stiffening elements 5 are provided, in this exemplary embodiment produced from metal. They are separately connected to the support part 2.

Figure 2:
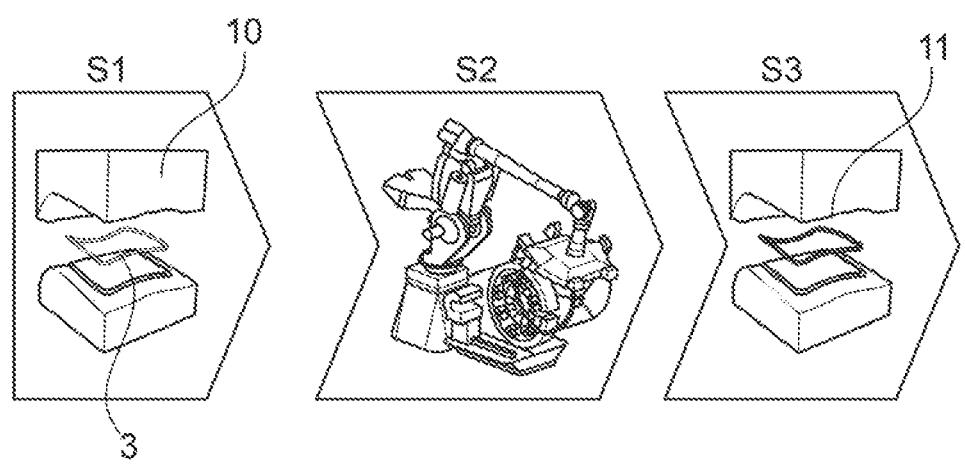
FIG. 2 shows a production method given by way of example.

In FIG. 2, the production process of the frame 3 is shown in three important method steps. In step S1, the core 3 is produced from PU foam, wherein a stiff form is obtained. The frame is in this case injection-moulded and foamed in a mould 10.

In the second method step S2, glass fibres or carbon fibres are wound around the foamed frame 3 in an endless process by a winding machine. Subsequently, in a third method step S3, the frame 3 of PU material wound with the fibres is consolidated and/or penetrated with composite material, such as epoxy or vinyl ester, in a further mould 11. The same plastics material as in the first method step S1 or some other plastics material may be used for this.

If it is wished to avoid using metal stiffening elements 5, the frame 3 must have a considerable thickness or a large cross section 20 specifically in the region 3a of the upper edge of the tailgate to be produced. This great material thickness does not have to extend over the entire frame, since the requirement for the frame is not the same over the entire length of the frame. Therefore, the frame is designed such that the cross section of the frame varies significantly over the length of the frame and is only increased in the region of high mechanical loading.

The cross section of the frame thereby changes from a large cross section 20 to a small cross section 21.

However, with large different cross sections of the component, it is necessary to wait during the production of the foamed plastic until the region of the greatest thickness has completely cured throughout the entire cross section. As a result, the cycle time in the production of the frame in step S1 is very long and is a problem for industrial production.

The problem is addressed by introducing insert parts 6 into the mould 10 for the foaming of the frame. The insert parts 6 have the effect of reducing the large cross section 20 of the frame in the region 3a of the great thickness d1, which has to cure in the foaming process. As shown in FIG. 3b, there remains a residual thickness between the insert part 6 and the outer surface of the frame 3, which has to cure.

The insert parts 6 are in this case preferably of the same material as the rest of the frame 3.

The insert parts 6 must be available for the respective method step S1.

Therefore, during production, in the first method step S1, insert parts 6 of PU foam are produced together with the frame 3 in a mould 10. The form of the mould of the frame 3 is thereby expanded such that, as can be seen in the example of FIG. 4, two insert parts 6 are moulded with PU material and foamed in the lower region 6a of the frame 3. The positioning of the insert parts 6 is in this case preferably at the end of the material flow path, that is to say the insert parts 6 with this smaller thickness d2 are produced in the opposite cavity from the injection point of the mould in the region 3a. As an exemplary embodiment, the insert parts are positioned in a region 6a, in which the frame 3 has a small cross section 21 and the insert parts 6 are produced with this smaller thickness d2.

The form and size of the insert parts must in this case correspond to the region 3a of the frame. In FIG. 3a, a rectangular cross section is only depicted by way of example. In this example, the insert part 6 "floats" in the material of the reaction-moulding process. In FIG. 3b, on the other hand, the form is approximately half-filled by the insert part 6 and the insert part lies with at least one side directly against the wall of the mould. It is possible that three outer sides of the insert part lie directly against the wall of the mould.

After the removal of the frame 3 from the mould 10, the insert parts 6 are removed from the frame 3 and the sprue connections are taken off. The frame 3 is further processed as described further above.

For the next frame 3, the insert parts 6 from the previously performed process step S1 are used in process step S1 and are placed into the mould 10 of the frame 3. Since the material of the insert elements 6 is the same plastics material, the insert elements 6 are surrounded and integrated by the PU foam without any problems. As a result, in the region of the greatest thickness d1 of the frame 3, only a small thickness of foam, to be specific d1-d2, cures. The cycle time can be significantly reduced.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE NUMERALS

1 Component
2 Support part
3 Frame
3a Region
4 Trim part
5 Reinforcing part
6 Insert parts
6a Region
10, 11 Moulds
20 Large cross section
21 Smaller cross section
d1, d2 Thicknesses

What is claimed is:
1. A method for producing reinforcing components from different materials, comprising:

in a first step producing a component in a first mould by placing at least one insert part of a first plastic in the first mould and plastics injection-moulding with foaming of additional first plastic material in the first mould, and making another of the at least one insert parts during the first step in a second step, winding at least one type of fibre around the component;

in a third step, overmoulding, penetrating, or consolidating the component and fiber with a second plastics material in a second mould to form a reinforcing component; and repeating the first step, second step, and third step with the another of the at least one insert parts placed in the first mould to form a subsequent reinforcing component.

2. The method according to claim 1, wherein the at least one insert part fills a cross section in the mould in a region of the component up to a value of 50% of a total cross section of space in the mould in the region of the component.

3. The method according to claim 1, wherein the at least one insert part is also moulded and foamed in a position of the component at which the component is smaller in its cross section than a region of a largest cross section.

4. The method according to claim 3, wherein a cross section of a size reduction of the component at the position corresponds to approximately the cross section of the insert part.

5. The method according to claim 1, wherein the reinforcing component is a stiffening component in automobile construction.

6. The method according to claim 5, wherein the stiffening component is a frame of a vehicle door or a vehicle flap.

7. The method according to claim 5, wherein the stiffening component is fitted in a composite on further plastic components.

8. A method for producing a reinforcing component for a vehicle, comprising: producing a reinforcing component with a first material, in a first mould and with a plastic injection moulding process;

inserting at least one insert part in the first mould prior to producing the reinforcing component in order to provide a reduced cross section of the reinforcing component in the region of the insert part;

moulding at least one insert part in the first mould during the moulding process for use during a subsequent reinforcing component producing process;

winding at least one type of fibre around the component produced in the first mould; and repeating the steps of producing a reinforcing component, inserting at least one insert part, and moulding at least one insert part with the another of the at least one insert parts placed in the first mould to form a subsequent reinforcing component.

9. A method as set forth in claim 8, further including overmolding the reinforcing component with a second material that is different than the first material in a second mold.

10. A method as set forth in claim 8, wherein the at least one insert part is made of the first material.

11. A method as set forth in claim 8, wherein the plastics injection molding process includes foaming of the first plastic material.

* * * * *